Aug. 8, 1967  H. C. STROBEL  3,334,946

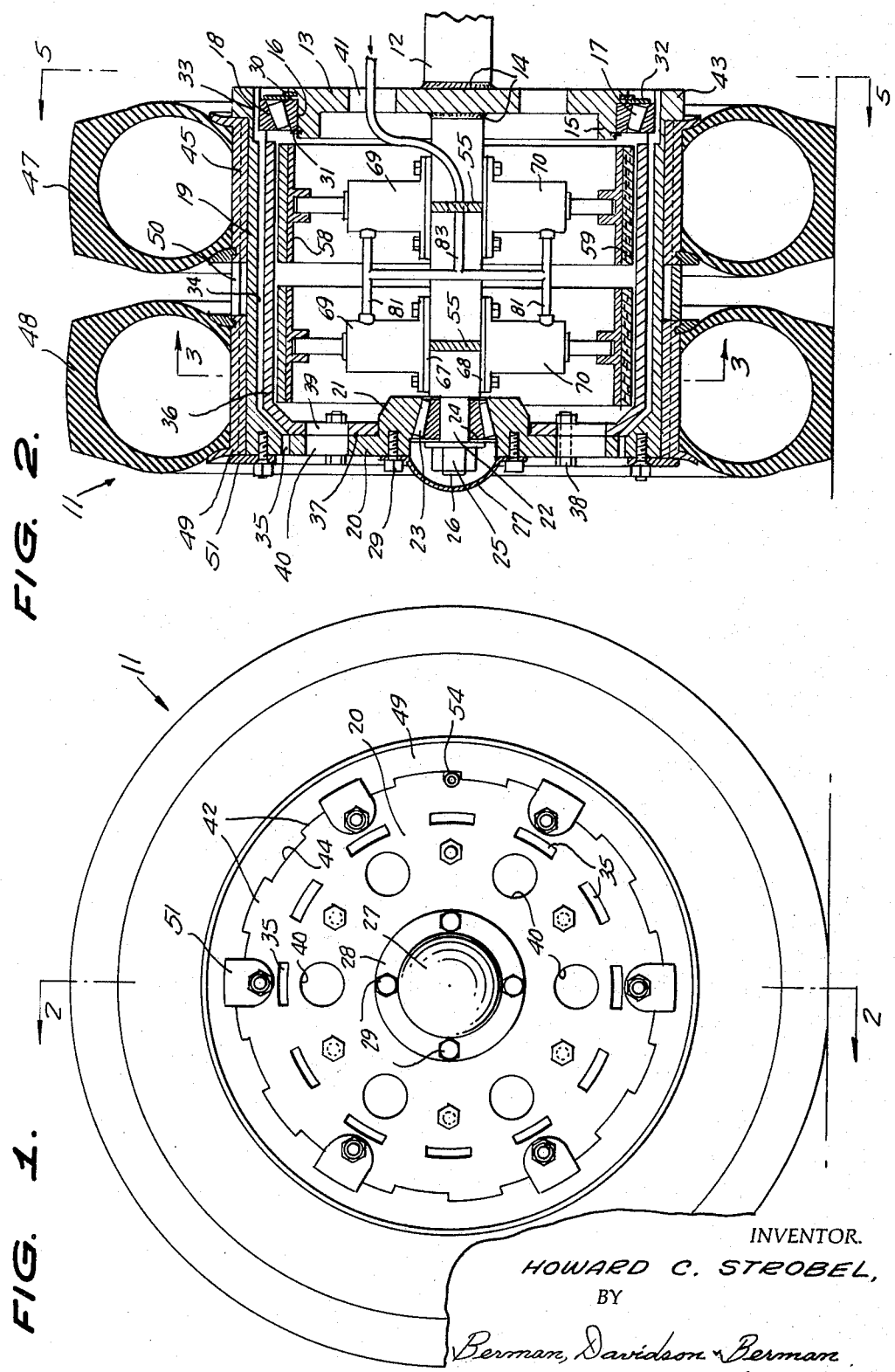

VEHICLE WHEEL AND BRAKE

Filed Jan. 18, 1966  2 Sheets-Sheet 2

INVENTOR.
HOWARD C. STROBEL,
BY
Berman, Davidson & Berman
ATTORNEYS.

United States Patent Office 3,334,946
Patented Aug. 8, 1967

3,334,946
VEHICLE WHEEL AND BRAKE
Howard C. Strobel, R.D. 3, Butler, Pa. 16001
Filed Jan. 18, 1966, Ser. No. 521,345
7 Claims. (Cl. 301—6)

ABSTRACT OF THE DISCLOSURE

A vehicle wheel and brake assembly wherein the wheel has a cylindrical main body on which tire ends are mounted for pneumatic tires. An axle extends through the body, carrying a disc on which one end portion of the cylindrical main body is journaled. The main body has an opposite end wall in which the axle is also journaled. A brake drum is secured to said opposite end wall and is contained in the main body, and brake shoes are pivoted to the axle to engage the inside surface of the brake drum. The brake shoes are operated by air cylinders connected between the brake shoe and the axle. The shoes are spring-biased for contact with the inside surface of the drum and are disengaged from the drum by admitting compressed air into the air cylinders.

This invention relates to improvements in vehicle wheel structure, and more particularly to an improved vehicle wheel assembly of the type incorporating wheel-braking means and being especially useful with trucks or similar vehicles employing dual wheels.

A main object of the invention is to provide a novel and improved safety wheel and brake assembly for use on trucks, trailers, or similar vehicles, the assembly being relatively simple in construction, being arranged to prevent slipping of the tire rim elements thereof with respect to the main wheel body on which the rim elements are mounted, being arranged to prevent damage to the valve stems associated with the tires mounted on the wheels, and being amply ventilated to provide efficient cooling of the brake drum portions of the wheel assemblies.

A further object of the invention is to provide an improved vehicle wheel and brake assembly which involves relatively inexpensive components, which is durable in construction, which provides reliable and smooth braking action, and which includes means to prevent the rim elements associated with the wheel assembly from working loose or from slipping relative to the remainder of the assembly.

A still further object of the invention is to provide an improved combination wheel and brake assembly particularly suitable for use on vehicles employing air brakes, such as large trucks, trailers, buses and the like, wherein dual-tired wheels are employed, the assembly being relatively compact in size, being amply ventilated so that the braking portions thereof are suitably cooled, and being arranged with means for locking the various portions of the assembly safely in working position so that there is no undesired displacement of any portions of the assembly relative to the other portions thereof, whereby the hazards of accidents due to slipping or displacement of the various parts of the assembly relative to each other are minimized.

Further objects and advantages of the invention will become apparent from the following description and claims, and from the accompanying drawings, wherein:

FIGURE 1 is a fragmentary outer side elevational view of an improved combination wheel and brake assembly constructed in accordance with the present invention.

FIGURE 2 is a transverse vertical cross-sectional view taken substantially on the line 2—2 of FIGURE 1.

Figure 3:
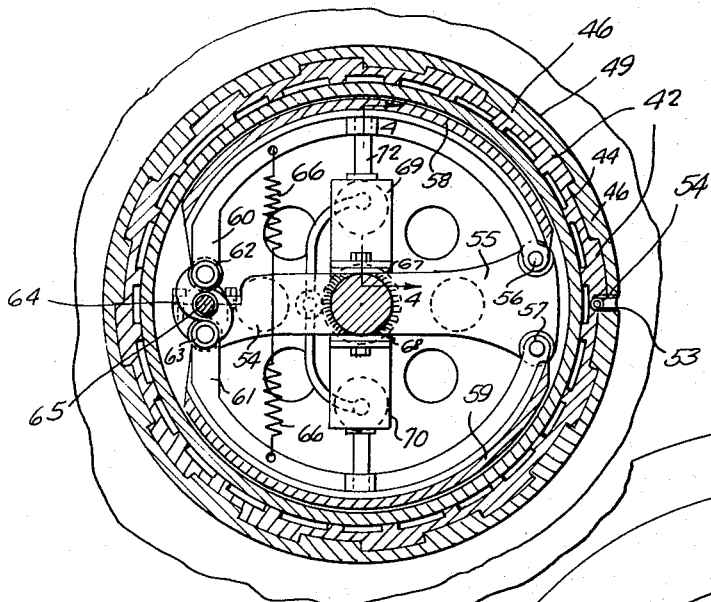
FIGURE 3 is a fragmentary transverse vertical cross-sectional view taken substantially on the line 3—3 of FIGURE 2.

Referring to the drawings, 11 generally designates an improved combination wheel and brake assembly constructed in accordance with the present invention. The assembly 11 comprises a dual-tired wheel construction especially suitable for use on heavy vehicles, such as trucks, trailers, buses, or the like. The assembly 11 is mounted on an axle 12 which is substantially fixed relative to the frame of the associated vehicle. Rigidly-secured on axle 12 is an inner supporting disc member 13, said disc member being centrally-fastened in any suitable manner to axle 12, as by welds 14, 14. Disc 13 is formed with an annular peripheral flange 15 on which is mounted the inner race 16 of a conventional roller-bearing assembly including the bearing rollers 17 and the outer race 18. The outer race 18 is secured to the inside rim of a generally cylindrical wheel drum member 19 which is substantially coaxial with the axle 12 and which is provided with the outer generally circular wall 20 extending perpendicular to the axis of axle 12 and formed with an inwardly-projecting annular hub portion 21 which is rotatably-supported on the reduced outer end portion 22 of axle 12 by a conventional roller-bearing assembly 23, as shown in FIGURE 2. The roller-bearing assembly 23 is suitably retained by means of an outer retaining washer 24 and a flanged nut 25 threadedly-engaged on the further reduced outer end portion 26 of axle 12, as is clearly shown in FIGURE 2. An outwardly-convex hub cap 27 is secured externally to the hub portion 21 covering nut 25 and stud element 26, the hub cap 27 being provided with the outer peripheral flange 28 which is detachably-secured to the hub portion of disc 20 by fastening bolts 29.

The inner race 16 of the first-mentioned roller-bearing assembly associated with the fixed disc member 13 is provided with respective inner and outer annular retaining rings 30 and 31 of the spring type which are engaged in suitable annular grooves provided therefor in the flanged portion of disc member 13. A flat grease-retaining ring 32 is provided adjacent the outer ends of the bearing race members 16 and 18, being retained thereagainst by the ring 30 and covering the space provided for the rollers 17, acting to retain the grease lubricant employed in connection with the roller-bearing assembly and preventing excessive loss of such lubricant. The outer peripheral edge of ring 32 is spaced slightly inwardly relative to the outer peripheral surface of the outer race element 18.

The inside surface of the wheel drum member 19 is formed with spaced longitudinally-extending grooves or recesses 33 which traverse the outer race member 18 and which establish communication between the atmosphere and spaced longitudinally-extending grooves or recesses 34 formed in the inside wall surface of drum member 19, said grooves or recesses leading to respective slots 35 formed in the circular wall portion 20 of the wheel drum member, whereby to define ventilation passages allowing air to travel laterally through the assembly, namely, from the outside through the inside thereof and serving to prevent over-heating of drum member 19.

Designated at 36 is a generally cylindrical brake drum which is nested inside the drum member 19 and which is provided with the circular wall portion 37 which surrounds hub portion 21 and is secured to wall 20 by a plurality of bolts 38. As will be readily apparent, the recesses 34 serve also as a cooling means for the outer surface of brake drum 36, since air flowing through the recesses 34 is in direct contact with the outer surface of brake drum 36. The wall 37 of the brake drum and the wall 20 of the wheel drum 19 are formed with registering circular apertures 39 and 40 defining air ventilation openings to allow outside air to freely enter the interior of brake drum 36. Disc member 13 is likewise formed with ventilation openings 41 so that air may travel freely through the interior of the brake drum 36 to cool the interior of the drum, as well as the working parts of the brake assembly contained therein.

The outer surface of the cylindrical wheel drum member 19 is integrally-formed with spaced longitudinal ribs or splines 42 which extend from the outer side of the wheel assembly, namely, from the wall portion 20 thereof for the major portion of the axial length of drum 19, merging with a continuous peripheral rib element 43 at the inner rim of the drum member 19, thereby defining longitudinal splined grooves between the ribs 42, said splined grooves being shown at 44. Designated at 45 is a first annular wheel rim element formed with internal longitudinal splined ribs 46 slidably-engageable in the grooves 44, the rim member 45 being positioned adjacent to and in abutment with the inner annular rib element 43, as shown in FIGURE 2. A conventional pneumatic tire 47 is mounted on the wheel rim member 45 and similarly disposed on the splined external periphery of drum member 19 is a second pneumatic tire 48 mounted in a wheel rim member 49 similar in construction to the wheel rim member 45 and thereby lockingly-engaged with the splined outer periphery of drum 19. A spacer ring 50 is disposed between the wheel rim members 49 and 45, as shown in FIGURE 2, and spaced retaining lugs 51 are bolted to the outer marginal portion of wall 20, overlying the edge of the wheel rim member 49, as shown in FIGURE 2, to retain both wheel rims 49 and 45 on the drum 19. The valve stems associated with the pneumatic tires 48 and 47 extend through openings 53 extending adjacent the external side flanges of the wheel rim members, in the manner illustrated in FIGURE 3, wherein the valve stem 54 associated with the pneumatic tire 48 is received in such an opening 53 provided in wheel rim member 49.

Welded on the axle 12 inside the brake cylinder or drum 36 are spaced pairs of diametrically oppositely-extending arms 54, 55, said arms comprising plate members arranged vertically and extending substantially longitudinally of the associated vehicle frame. Pivoted to the top and bottom outer corner portions of the rear arms 55, as shown at 56 and 57, are respective top and bottom arcuately-curved brake shoes 58 and 59 engageable with the inside cylindrical wall surface of the brake drum 36. The opposite ends of the brake shoes 58 and 59 are provided with inwardly-projecting opposing arms 60 and 61 having rollers 62 and 63 journaled on their ends and engaging the opposite, sinuously-curved side edges of an S-shaped cam 64, the cams 64 being secured on a common brake-operating shaft 65 which extends parallel to the axle 12 and extends rotatably through and is journaled in the disc member 13. The shaft 65 is connected in a conventional manner to the brake-operating mechanism of the associated vehicle.

The respective pairs of brake shoes 58 and 59 are connected together by coiled springs 66 so that the rollers 62 and 63 are biased into engagement with the sinuously-curved opposite side edges of the S-shaped cams 64. By rotating the cams 64 in a clockwise direction, as viewed in FIGURE 3, the brake shoes 58, 59 are rotated outwardly around their pivotal connections 56, 57 and urged against the inside surface of the brake drum 36, producing braking action.

Figure 4:
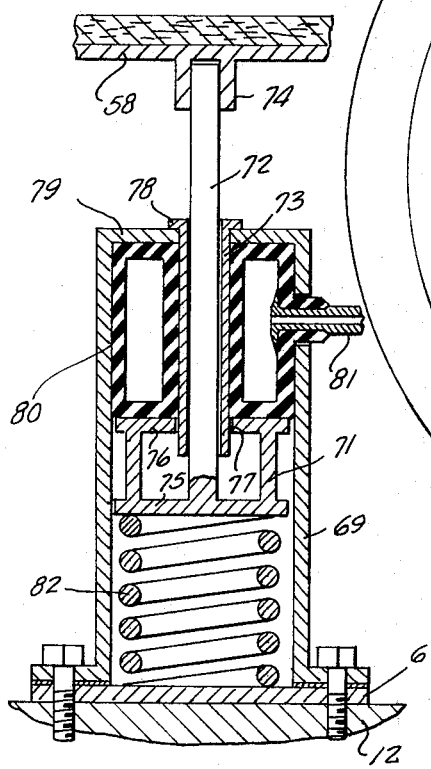
FIGURE 4 is an enlarged vertical cross-sectional detail view taken substantially on the line 4—4 of FIGURE 3.
Figure 5:
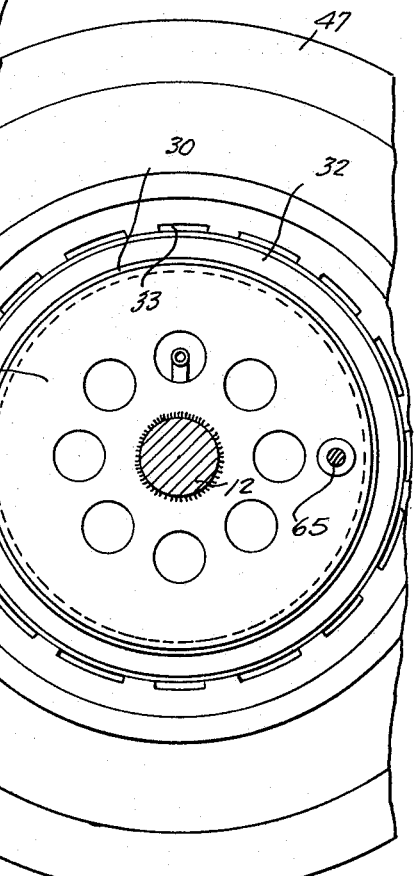
FIGURE 5 is a fragmentary transverse vertical cross-sectional view taken substantially on the line 5—5 of FIGURE 2.

Rigidly-secured on the axle 12 and on the adjacent top and bottom edges of the plate-like arms 54 and 55 are respective top and bottom supporting plates 67 and 68 on which are mounted the respective pairs of oppositely-extending air cylinders 69 and 70. Each cylinder contains a plunger 71 formed integrally with an axial plunger rod 72 which extends slidably through a bearing sleeve 73 and which is received in a socket element 74 formed in the adjacent brake shoe 58 or 59. As shown in FIGURE 4, each plunger 71 is hollow and has a bottom wall 75 and an upper or outer wall 76 parallel thereto and formed with a central aperture 77 which slidably-receives the inner end of the sleeve member 73, the outer end of the sleeve member being formed with a flange 78 secured to the outer or top wall 79 of the associated cylinder 69. An annular casing or envelope 80 of resilient deformable material, such as rubber, or the like, surrounds the sleeve member 73 in the space between piston wall 76 and cylinder end wall 79, the elastic envelope 80 being provided with an outlet conduit 81 which is connected to a suitable compressed-air source provided on the associated vehicle so that the envelope 80 is normally in an inflated condition. A relatively heavy coiled spring 82 is disposed between the supporting plate 67 and the wall 75 of plunger 71, biasing the plunger away from the supporting plate 67, namely, acting to urge the associated brake shoe 58 or 59 outwardly into frictional engagement with the inside surface of the brake drum 36. The braking action of the spring 82 is normally opposed by and neutralized by the fluid pressure existing in the elastic envelope 80. When the fluid pressure drops, namely, when the associated compressed air supply-conduit system is opened or broken, the associated spring 82 expands to force the brake shoe 58 or 59 into braking engagement with brake drum 36.

The conduits 81 are connected to a common supply conduit 83 extending through the innermost plate-like arm 55 and through an aperture 41 of disc 13 to the compressed-air reservoir or other suitable compressed-air source provided on the associated vehicle. The conduit system is suitably provided with a control valve which may be employed to open the line whenever it is desired to apply the vehicle brakes, namely, whenever it is desired to vent the elastic envelopes 80 of the various cylinders 69 and 70 of the vehicle. Thus, the cylinders 69 and 70 form part of the emergency-brake system of the vehicle, the brakes being operated for service applications by means of the brake-operating shafts 65 and their associated operating linkages or mechanisms, as above-described.

It will be noted that with the tire rim elements 45 and 49 mounted in the manner above-described, said rim elements are positively held against slipping circumferentially on the main wheel drum 19, so that the wheel rims 45 and 49 rotate as a unit with the wheel drum 19. Thus, the rim elements 45 and 49 cannot slip circumferentially relative to the wheel drum even when the brakes are suddenly applied or when a condition of heavy loading occurs relatively suddenly. At the same time, the wheel rim elements 45 and 49 are easily removable whenever it is necessary to change tires, or for any other reason, by merely unfastening the retaining lugs 51 and sliding the wheel rim elements laterally off the main wheel drum 19.

The braking surfaces inside the wheel are kept relatively cool because of the free flow of air provided through the brake drum 36 by the provision of the ventilating openings 40, 39 and 41. The outer surface of the brake drum 36 is also efficiently ventilated by the provision of the air passages 34, 35 and the connecting ventilating passages 33 providing flow of air past the roller-bearing assemblies 16, 17 and 18.

The inflated envelopes 80 and the coiled springs 66 normally counterbalance the expansive forces of the spring 82, holding the brake shoes 58, 59 just clear of the inside surface of the associated brake drum 36. For service applications, however, the brake shoes 58, 59 are readily movable into frictional engagement with the inside surface of the brake drum 36 by rotating the associated service brake-operating shaft 65 to force the rollers 62, 63 apart, in the manner above-described. Thus, relatively little torque is required to cause cam 64 to act on rollers 62, 63 to cause braking action. The service brake applying system is thus highly sensitive to the operation of its associated mechanism, thus allowing the brakes to be quickly applied whenever they are required. At the same time, the brakes will be applied almost instantly responsive to the venting of the elastic envelopes 80, for example, under emergency conditions by the operation of the associated emergency-brake valve, or where the air line in the compressed air-supply system becomes broken.

While a specific embodiment of an improved combination vehicle wheel and brake structure has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. In combination, a vehicle axle, a main generally cylindrical wheel body, means to rotatably-support said wheel body on said axle, a tire rim, a pneumatic tire mounted on said tire rim, means to secure said tire rim on said wheel body, a brake drum rigidly-secured in said wheel body coaxially therewith and surrounding said axle, support means on said axle, brake shoe means pivoted to said support means and being frictionally-engageable with the inside surface of said brake drum, brake cylinder means mounted on said support means, piston means in said brake cylinder means, means drivingly-connecting said piston means to said brake shoe means, spring means biasing said brake shoe means toward the inside surface of said brake drum, and fluid pressure means inside said brake cylinder means acting in opposition to said spring means, and wherein the means to rotatably support the wheel body on the axle comprises a disc member coaxially secured on the axle adjacent one end of the wheel body, a first bearing assembly disposed between the periphery of the disc member and the wheel body, the wheel body having a transverse wall at its other end, said axle extending centrally through said transverse wall, and a second bearing assembly disposed between the axle and said transverse wall.

2. The structural combination of claim 1, and wherein said transverse wall, said brake drum and said disc member are formed with ventilation apertures to allow the passage of air through the brake drum.

3. The structural combination of claim 2, and wherein the wheel body is formed with longitudinal ventilation passage means adjacent the outer surface of the brake drum and extending for the entire axial length of the wheel body.

4. The structural combination of claim 3, and wherein said longitudinal ventilation passage means includes longitudinal recesses formed in the inside wall surface of the wheel body and traversing said first bearing assembly.

5. The structural combination of claim 4, and wherein said support means comprises a vertically-arranged plate-like arm rigidly-secured to said axle and extending substantially radially therefrom, the brake shoe means being pivotally-connected to the outer end portion of said arm.

6. The structural combination of claim 5, and wherein said brake shoe means comprises a pair of oppositely-arranged arcuate brake shoes pivoted to respective opposite corner portions of the outer end of said arm, said brake cylinder means comprising respective brake cylinders mounted on opposite edges of said plate-like arm, said piston means comprising respective pistons in the cylinders, each having an outwardly-directed piston rod, the means drivingly-connecting the piston means to the brake shoe means comprising socket elements on the intermediate portions of the brake shoes receiving the outer ends of the piston rods.

7. The structural combination of claim 6, and wherein said fluid-pressure means comprises respective inflatable elastic annular envelopes inside the brake cylinders and surrounding the piston rods, and means to admit pressure fluid into the elastic envelopes.

References Cited
UNITED STATES PATENTS

| | | | |
|---|---|---|---|
| 2,751,959 | 6/1956 | Bloomquist | 301—5 X |
| 2,927,822 | 3/1960 | Rabe | 301—6 |
| 3,043,630 | 7/1962 | Heitzman | 301—6 |
| 3,194,353 | 7/1965 | Rick | 188—170 X |
| 3,243,018 | 3/1966 | Merkle | 188—170 X |

LEO FRIAGLIA, *Primary Examiner.*

RICHARD J. JOHNSON, *Examiner.*